(12) United States Patent
King et al.

(10) Patent No.: US 8,963,365 B2
(45) Date of Patent: Feb. 24, 2015

(54) SYSTEM AND METHOD FOR OPTIMIZING ENERGY STORAGE DEVICE CYCLE LIFE

(75) Inventors: Robert Dean King, Schenectady, NY (US); Irene Michelle Berry, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 726 days.

(21) Appl. No.: 13/209,138

(22) Filed: Aug. 12, 2011

(65) Prior Publication Data

US 2013/0038127 A1    Feb. 14, 2013

(51) Int. Cl.
*B60L 1/00*    (2006.01)
*B60L 3/00*    (2006.01)
*B60L 11/18*   (2006.01)

(52) U.S. Cl.
CPC .......... *B60L 11/1857* (2013.01); *Y02T 10/7005* (2013.01); *Y02T 10/705* (2013.01); *Y02T 10/70* (2013.01)
USPC ............... 307/10.1; 307/9.1; 307/44; 307/64; 307/66; 320/109; 320/103; 320/137; 361/749; 361/788; 174/255; 180/65.21

(58) Field of Classification Search
USPC ..................... 307/10.1, 108, 43, 104; 369/1; 180/65.4; 701/22
See application file for complete search history.

(56) References Cited

U.S. PATENT DOCUMENTS

| 5,373,195 A | 12/1994 | De Doncker et al. |
| 6,331,365 B1 | 12/2001 | King |
| 6,737,822 B2 | 5/2004 | King |
| 7,049,792 B2 | 5/2006 | King |
| 2006/0250902 A1* | 11/2006 | Bender et al. .................. 369/1 |
| 2007/0068714 A1* | 3/2007 | Bender ...................... 180/65.4 |
| 2010/0235025 A1 | 9/2010 | Richter et al. |
| 2010/0235030 A1* | 9/2010 | Xue et al. .................... 701/22 |
| 2011/0084648 A1* | 4/2011 | Cao et al. .................... 320/103 |

* cited by examiner

*Primary Examiner* — Rexford Barnie
*Assistant Examiner* — Jagdeep Dhillon
(74) *Attorney, Agent, or Firm* — Ziolkowski Patent Solutions Group, SC; Jean K. Testa

(57) ABSTRACT

A multi-energy storage device system is provided that includes a first energy storage device (ESD) coupled to a direct current (DC) link. A bi-directional buck/boost converter includes an output channel coupled to the DC link and an input channel. A second ESD coupled to the input channel has a usable energy storage range defining an entire amount of usable energy storable therein. A database includes stored information related to a known acceleration event. A system controller is configured to acquire the stored information related to the known acceleration event and, during the known acceleration event, cause the buck/boost converter to boost the voltage of the second ESD and to supply the boosted voltage to the DC link such that after the known acceleration event, the state of charge of the second ESD is less than or substantially equal to a minimum usable energy storage state of charge.

22 Claims, 6 Drawing Sheets

SYSTEM AND METHOD FOR OPTIMIZING ENERGY STORAGE DEVICE CYCLE LIFE

BACKGROUND

Embodiments of the invention relate generally to vehicle drive systems and, more specifically, to controlling an energy management system to optimize the cycle life of an energy storage device in a vehicle or non-vehicle system.

Electric vehicles and hybrid electric vehicles are typically powered by one or more energy storage devices, either alone or in combination with an internal combustion engine. In pure electric vehicles, the one or more energy storage devices powers the entire drive system, thereby eliminating the need for an internal combustion engine. Hybrid electric vehicles, on the other hand, include energy storage device power to supplement power supplied by an internal combustion engine, which greatly increases the fuel efficiency of the internal combustion engine and of the vehicle. Traditionally, the energy storage devices in electric or hybrid electric propulsion systems include batteries, ultracapacitors, flywheels, or a combination of these elements in order to provide sufficient energy to power an electric motor.

When two or more energy sources are used to provide power to drive system, the energy sources are typically well-suited to provide different types of power. A first energy source, for example, may be a high energy source that is more efficient at providing long-term power while a second energy source may be a high specific-power source more efficient at providing short-term power. The high specific-power source may be used to assist the high energy source in providing power to the system during, for example, acceleration or pulsed load events. Often, the high specific-energy source has a charge/discharge cycle life that is lower than the cycle life of the high power source.

One approach to increasing the cycle life of the high energy source may include increasing the size and/or energy rating of the source. However, increasing any of these parameters typically leads to an increased cost and weight of the high energy source and may potentially reduce acceleration rates if used in a vehicle application.

Therefore, it is desirable to provide a system that controls energy flow in a multi-source system to optimize the cycle lives of the power/energy sources used to deliver power to drive loads.

BRIEF DESCRIPTION OF THE INVENTION

In accordance with one aspect of the invention, a multi-energy storage device system includes a first energy storage device coupled to a direct current (DC) link and a load coupled to the DC link and configured to receive energy from the DC link. A bi-directional buck/boost converter assembly includes a first bi-directional buck/boost converter, the first bi-directional buck/boost converter comprising an output channel coupled to the DC link and comprising a first input channel. A second energy storage device coupled to the first input channel of the first bi-directional buck/boost converter via a first DC bus is included, the second energy storage device having a usable energy storage range defining an entire amount of usable energy storable in second energy storage device. The system also includes a system controller and a database comprising stored information related to a known acceleration event in which a supply of energy to the load is desired. The system controller is configured to acquire the stored information related to the known acceleration event and, during the known acceleration event, cause the first bi-directional buck/boost converter to boost the voltage of the second energy storage device and to supply the boosted voltage to the DC link to power the load such that after the known acceleration event, the state of charge of the second energy storage device is less than or substantially equal to a minimum usable energy storage state of charge.

According to another aspect of the invention, a method of assembling a propulsion energy system includes coupling a first energy storage device to a direct current (DC) link and coupling an output channel of a bi-directional buck/boost converter assembly the DC link, the bi-directional buck/boost converter comprising a bi-directional buck/boost converter. The method also includes coupling a second energy storage device to a first input channel of the bi-directional buck/boost converter and coupling a load to the DC link. The second energy storage device has a usable energy storage range defining an entire amount of usable energy storable in second energy storage device, and the load is configured to receive energy from one of the first energy storage device and the second energy storage device via the DC link. The method further includes coupling a controller to the first and second energy storage devices, to the bi-directional buck/boost converter, and to the load and configuring the controller to acquire a first set of stored information from a storage database, the first set of stored information related to a known acceleration event in which energy is to be supplied to the load. The controller is also configured to cause the bi-directional buck/boost converter to boost an the stored voltage in the second energy storage device during the known acceleration event and to supply the boosted voltage to the DC link to power the load such that after the known acceleration event, the state of charge of the second energy storage device is less than or substantially equal to a minimum usable energy storage state of charge.

According to yet another aspect of the invention, a non-transitory computer readable storage medium having a computer program stored thereon and representing a set of instructions that when executed by a computer causes the computer to access a database comprising stored information related to a known acceleration event in which a supply of energy to a load is recorded for increasing a speed of rotation associated with the load. The set of instructions also cause the computer to cause a bi-directional buck/boost converter to boost a first energy storage device and to supply the boosted voltage to a DC link to power the load during the known acceleration event to increase the speed of rotation associated with the load such that after the known acceleration event, the state of charge of the first energy storage device is less than or substantially equal to a minimum usable energy storage state of charge, wherein the first energy storage device has a usable energy storage range defining an entire amount of usable energy storable therein.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention relate to vehicle and non-vehicle applications. Vehicular applications may include pure-electric or hybrid-electric vehicle applications in, for example, on-road and off-road vehicles, golf cars, neighborhood electric vehicles, forklifts, and utility trucks as examples. Non-vehicular applications may include non-vehicular types of loads including pumps, fans, winches, cranes, or other motor driven loads. While described with respect to the vehicular applications, embodiments of invention are not intended to be limited to such.

Figure 1:
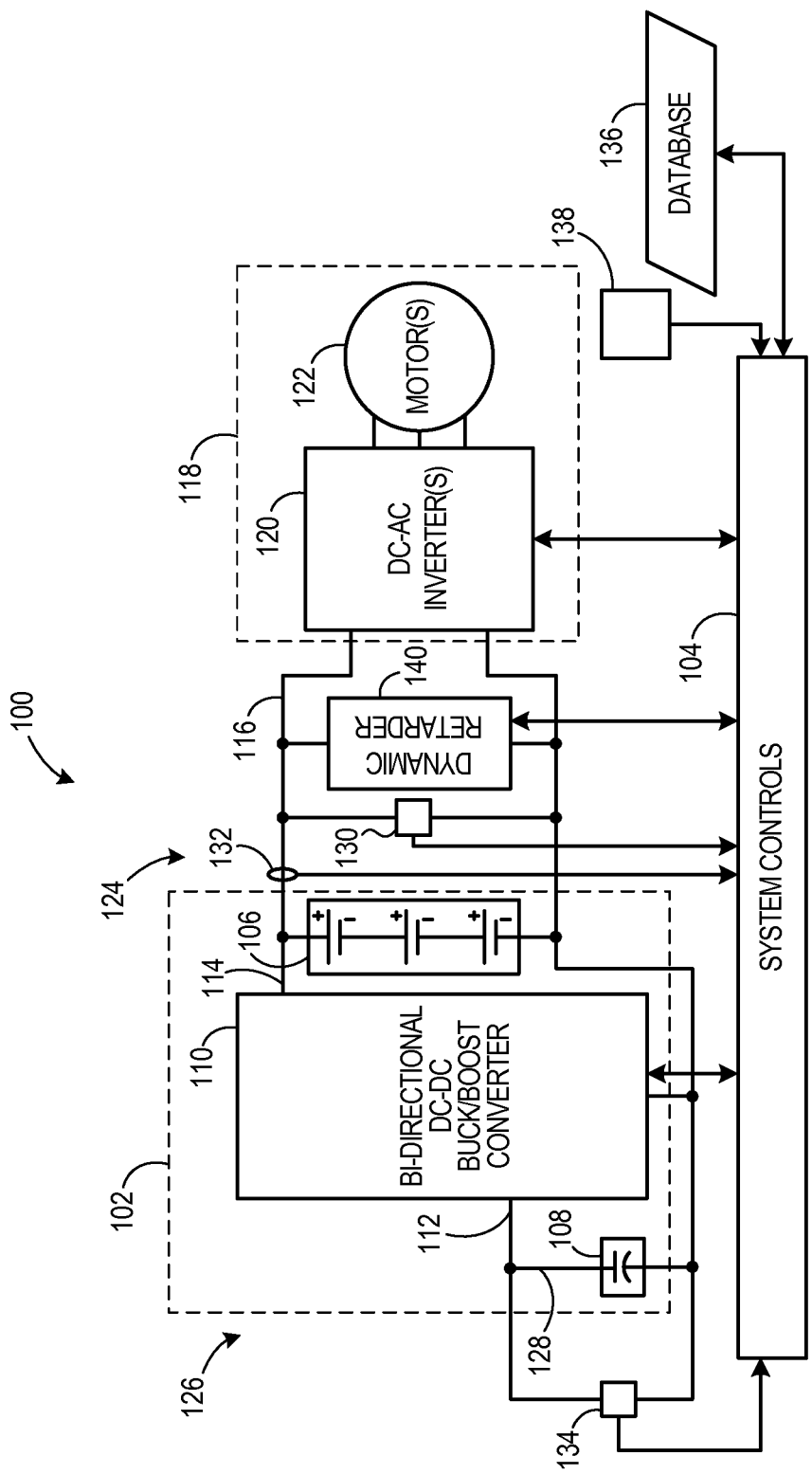
FIG. 1 schematically illustrates an embodiment of a propulsion system according to an embodiment of the invention.

FIG. 1 illustrates a propulsion system 100 according to an embodiment of the invention. Propulsion system 100 may be used in electric or hybrid vehicle applications. Vehicle propulsion system 100 includes an energy system 102 and a system controller 104. Energy system 102 includes a first energy storage device 106, a second energy storage device 108, and a buck/boost converter assembly 110 having an input channel 112 coupled to a bi-directional DC-DC buck/boost converter and having an output channel 114 coupled to a DC link 116. First energy storage device 106 is configured to have a high energy storage capability, but has a lower, moderate cycle life. The cycle life may be determined as a function of the depth of discharge/recharge levels of an energy storage device. Second energy storage device 108 has a lower energy storage capability than first energy storage device, but has a higher cycle life than first energy storage device 106. Accordingly, the number of deep discharge and recharge cycles for second energy storage device 108 is higher than the number of equivalent deep discharge and recharge cycles of first energy storage device 106, which indicates that second energy storage device 108 will have a longer operating life than first energy storage device 106 when operated under equivalent conditions. While first energy storage device 106 is illustrated as a battery, another type of energy storage devices such as an ultracapacitor, a fuel cell, a flywheel, or the like is also contemplated. While second energy storage device 108 is illustrated as an ultracapacitor, another type of energy storage devices such as a battery, a fuel cell, a flywheel, or the like is also contemplated.

First energy storage device 106 is coupled via DC link 116 to a load 118, which, according to an embodiment of the invention, is an electric drive including a DC-AC inverter 120 and a motor or electromechanical device 122. Motor 122 is preferably an AC motor, but is not limited as such. While not shown, it is to be understood that each of a plurality of motors 122 may be coupled to a respective wheel or other load or that each motor 122 may be coupled to a differential for distributing rotational power to the wheels or other load.

Generally, in an accelerating mode of operation, voltage provided by first energy storage device 106, on a high voltage side 124 of energy system 102, is supplied to DC-AC inverter 120 via DC link 116 to drive motor 122. Bi-directional buck/boost converter 110 also acts to boost the voltage provided by a low voltage side 126 of energy system 102 to the high voltage side 124 of energy system 102. That is, voltage from second energy storage device 108 is provided to bi-directional buck/boost converter 110 via a bus 128 coupled to a first channel (a) thereof on the low voltage side 126 of energy system 102. The provided voltage is boosted by bi-directional buck/boost converter 110 such that the voltage provided to DC link 116 on the high voltage side 124 of energy system 102 is increased to an operating level of electric drive 118.

Voltage and current measurements on DC link 116 are provided to system controller 104 by a voltage measurement device 130 and a current measurement device 132, respectively. Measurements based on one or both of voltage measurement device 130 and current measurement device 132 may be used by system controller 104 to determine a state of charge (SOC) of first energy storage device 106. Another voltage measurement device 134 provides measurements of the voltage of second energy storage device 108 to system controller 104 for determination of its state of charge.

According to embodiments of the invention, system controller 104 is configured to control energy flowing from and flowing into first energy storage device 106 to optimize its cycle life. In this manner, the operating life of first energy storage device 106 may be extended, which results in fewer replacements and allows for lower-rated sources to be used that lower system costs.

Second energy storage device 108 has an upper or maximum usable SOC threshold above which the amount of usable energy stored therein is not increased by continued delivery of energy thereto. Other electrical parameter limits may also constrain the maximum useable value. Second energy storage device 108 also has a lower or minimum usable SOC threshold below which any remaining stored energy is unable to be used for vehicle propulsion. Other electrical parameter limits, for example reduced efficiency during operation at low values of SOC, may also constrain the minimum useable value. An entire usable energy storage range of second energy storage device 108 is the amount of energy storage between the upper and lower usable thresholds. If, for example, the second energy storage device 108 is an ultracapacitor, the useable energy is typically 75% of the ideal stored energy of the ultracapacitor when the device is operated from rated voltage to one-half of the ultracapacitor device rated voltage, and therefore the minimum value of SOC threshold would correspond to operation at one-half of rated voltage.

Operation of propulsion system 100 generally involves changing the speed of rotation of motor 122 via speed-changing events. In an acceleration mode of operation in which the speed of rotation of motor 122 is to be increased from zero or from its current speed to a higher speed, system controller 104 is programmed, according to embodiments of the invention, to blend utilization of the two energy storage devices such that the entire usable energy storage of the second energy storage device 108 is utilized to reduce the amount of energy draw from first energy storage device 106 during the acceleration mode. In a deceleration mode of operation in which the speed of rotation of motor 122 is to be decreased to zero or to a lower speed from its current speed, system controller 104 is programmed to operate electric drive 118 in a regenerative mode, wherein electric power or energy is returned to DC link 116 through DC-AC inverter 120 during a regenerative braking event. According to embodiments of the invention, system controller 104 causes the regenerative braking energy to be delivered to second energy storage device 108 and causes second energy storage device 108 to store a maximum amount of usable energy therein. Thus, the entire usable energy storage range of second energy storage device 108 is filled with energy during the deceleration.

To utilize the entire usable stored energy in second energy storage device 108, it is desirable to know a priori the periods of time that acceleration and deceleration will occur. Propulsion system 100 includes a database 136 configured to store information regarding historical or known acceleration and deceleration periods of the vehicle along a known route or according to vehicle acceleration/deceleration trends. A vehicle position sensor 138 is configured to determine a position of the vehicle along a route based on position identifiers such as mile markers, time of day, or global positioning system (GPS) location information, for example. The vehicle position information is related to acceleration events stored in database 136. Each acceleration and deceleration event in database 136 also contains information regarding the time duration of the acceleration or deceleration event. In a non-vehicle embodiment, the known acceleration and deceleration periods may be stored information events related to any demand of energy to be supplied to a load such as electric drive 118 or to any supply of energy from the load that can be captured and stored in energy storage devices 106, 108.

During the acceleration mode, system controller 104 uses the position of the vehicle sensed in vehicle position sensor 138 to locate the acceleration event in database 136 corresponding to the vehicle position. Based on the located acceleration event information from database 136, system controller 104 can determine the amount of time that acceleration will occur or can determine the amount of energy needed for acceleration. Based on the acceleration time or amount of energy and based on a state of charge of second energy storage device 108, system controller 104 causes all or substantially all of the usable stored energy from second energy storage device 108 to be supplied to DC link 116 via buck/boost converter assembly 110 during the acceleration event. According to preferred embodiments, the SOC of second energy storage device 108 is at or substantially near the upper usable SOC threshold at the start of the acceleration event and at or substantially near the lower usable threshold at the end of the acceleration event. In this manner, energy draw from first energy storage device 106 is reduced during the acceleration event and lowers the SOC of the second energy storage device 108 to substantially near the lower usable SOC threshold, thus reducing the amount of energy drawn from first energy storage device 106 during the acceleration event. Accordingly, the depth of discharge, as well as peak power, of first energy storage device 106 during the acceleration event is reduced, thus reducing deep discharge effects that can reduce the life cycle of first energy storage device 106.

During the deceleration mode, system controller 104 uses the position of the vehicle sensed in vehicle position sensor 138 to locate the deceleration event in database 136 corresponding to the vehicle position. Based on the located deceleration event information from database 136, system controller 104 can determine the amount of time that deceleration will occur or can determine the amount of expected energy to be generated. Based on the deceleration time or the expected energy and based on a state of charge of, system controller 104 causes electric drive 118 to operate in the regenerative mode and causes second energy storage device 108 to capture and store a portion of the regenerative braking energy to fill all of the usable stored energy space therein during the deceleration event. According to preferred embodiments, the SOC of second energy storage device 108 is brought to an SOC level at or substantially near the upper usable threshold. In this manner, the entire usable stored energy may be withdrawn therefrom as described above during the next acceleration event. The first energy storage device 106 captures and stores a portion of the regenerative braking energy. A dynamic retarder 140 coupled to DC link 116 may be also be controlled to moderate the levels of regenerative power or energy that develops on DC link 116 when electric drive 118 is operated at high power levels in regenerative mode or when the power level is above the limit of what can be recharged to the two energy storage devices 106, 108 such as during operation at relatively high values of SOC of the two energy storage devices 106, 108.

Figure 2:
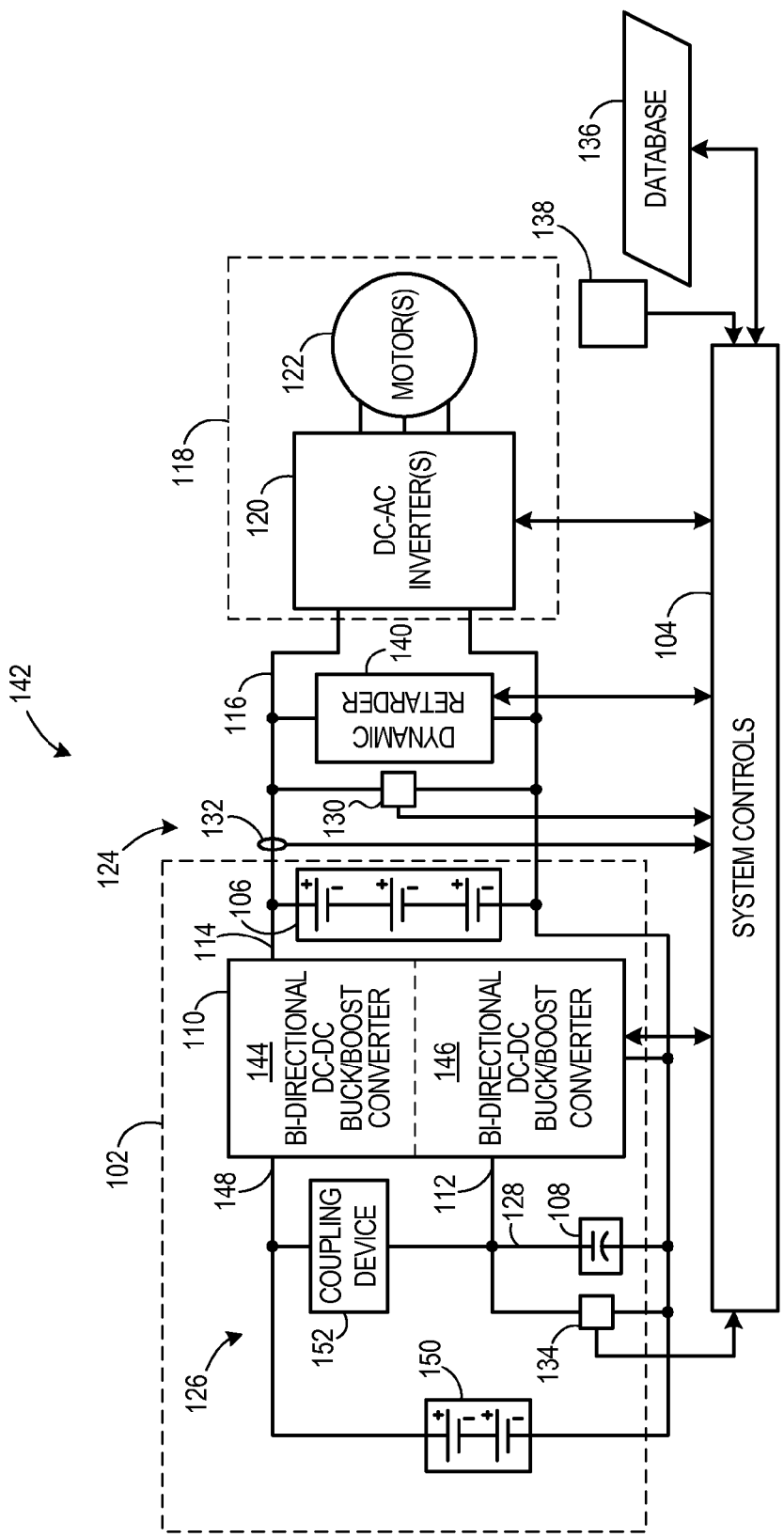
FIG. 2 schematically illustrates another embodiment of a propulsion system according to an embodiment of the invention.

FIG. 2 illustrates a propulsion system 142 according to another embodiment of the invention. Propulsion system 142 illustrates the application of propulsion system 100 in an electric vehicle application. Elements and components common to traction systems 100 and 142 will be discussed relative to the same reference numbers as appropriate.

As illustrated in FIG. 2, buck/boost converter assembly 110 is a multi-channel buck/boost converter assembly. That is, buck/boost converter assembly 110 includes first and second bi-directional DC-DC buck/boost converters 144, 146 having respective input channels 112 and 148. First and second bi-directional DC-DC buck/boost converters share the connection of output channel 114 to DC link 116.

In addition to components 102-140 common with propulsion system 100, energy system 102 of propulsion system 142 includes a third energy storage device 150 coupled to a second channel 148 of bi-directional buck/boost converter 110. Third energy storage device 150 preferably has a high specific-energy storage characteristic and, during a cruising or motoring mode of operation, provides power to motor(s) 122. Generally, bi-directional buck/boost converter 110 acts to boost the voltage provided by the low voltage side 126 of energy system 102 to the high voltage side 124 of energy system 102. That is, voltage from third energy storage device 150 is provided to a second channel 148 of bi-directional buck/boost converter 110 on the low voltage side 126 of energy system 102. The provided voltage is boosted by bi-directional buck/boost converter 110 such that the voltage provided to DC link 116 on the high voltage side 124 of energy system 102 is increased to an operating level of electric drive 118.

Propulsion system 142 also includes a coupling device 152 configured to selectively couple channel 112 of buck/boost converter assembly 110 to channel 148 thereof. In event that the usable power or energy stored by second energy storage device 108 is exhausted (such as after an acceleration event), coupling device 152 conducts such that voltage from third energy storage device 150 may be boosted to DC link 116 voltage using two channels (112 and 148) of bi-directional buck/boost converter 110 thereby allowing approximately twice the rated power compared to a single channel of bi-directional buck/boost converter 110 to facilitate operation of the vehicle.

In one embodiment, coupling device 152 is a diode configured to automatically couple channels 112 and 148 of bi-directional buck/boost converter 110 when the usable voltage of second energy storage device 108 drops below the lower voltage threshold. In another embodiment, coupling device 152 includes a voltage sensor (not shown) and a contactor (not shown). In this embodiment, when sensed voltage of second energy storage device 108 drops to or below the lower voltage threshold, system controller 104 can cause the contactor to close, thus coupling channel 112 to channel 148. Alternate implementations of the coupling device 152 could also be implemented with power semiconductor device(s), including Silicon Controller Rectifiers (SCR's) or a contactor.

Figure 3:
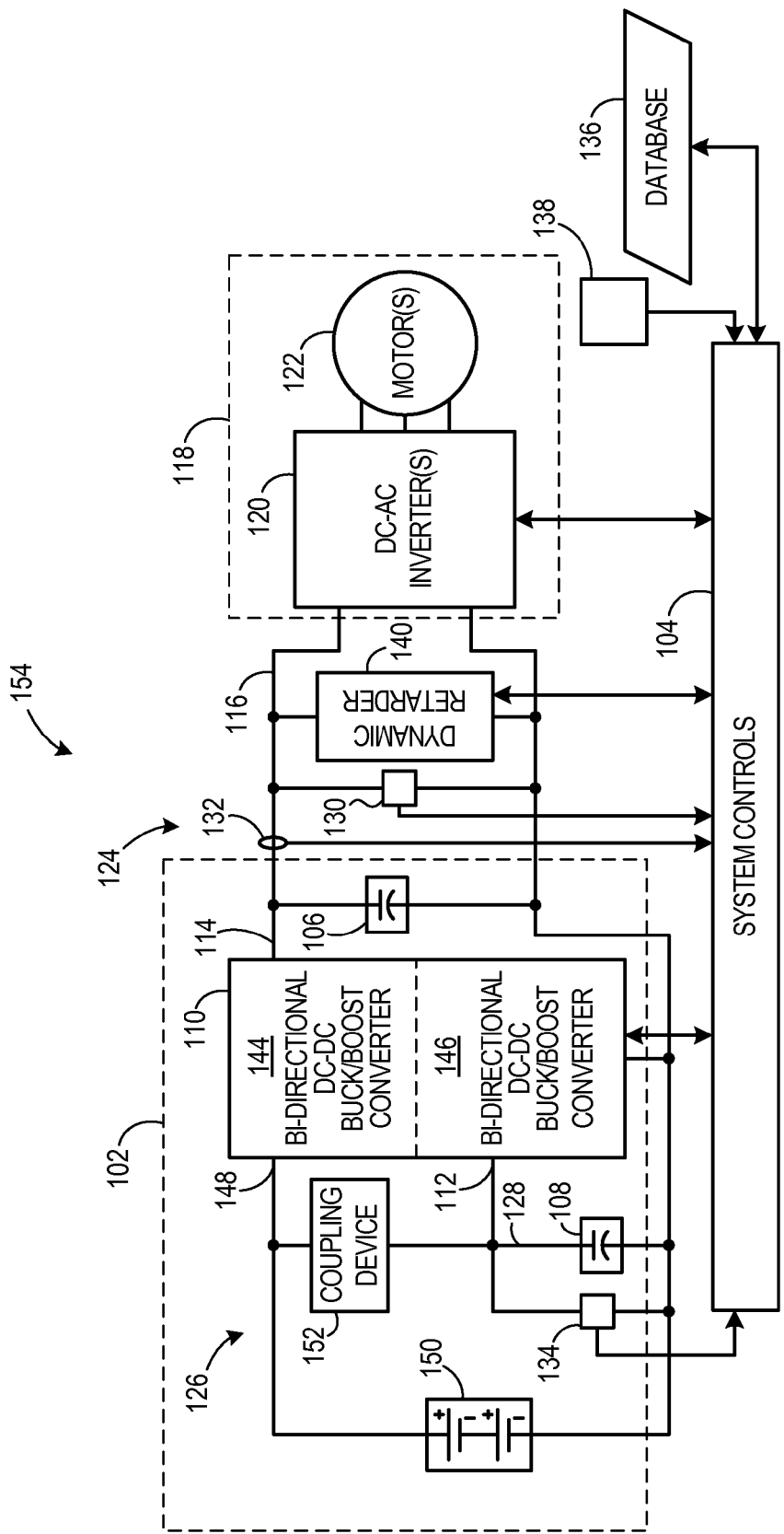
FIG. 3 schematically illustrates another embodiment of a propulsion system according to an embodiment of the invention.

FIG. 3 illustrates another embodiment of the invention. Propulsion system 154 shown in FIG. 3 illustrates a dual ultracapacitor embodiment of propulsion system 142 of FIG. 2. As shown in FIG. 3, first energy storage device 106 and second energy storage device 108 are ultracapacitors and are configured to supply additional power to electric drive 118 during acceleration events and to capture regenerative braking power during deceleration events.

In this embodiment, first energy storage device 106 has a higher power rating than second energy storage device 108, and its voltage matches the voltage of DC link 116. The voltage of second energy storage device 108 is lower than the voltage of DC link 116 and is boosted via buck/boost converter assembly 110 to the DC link voltage during acceleration events as described herein. Given that energy storage devices 106, 108 are both ultracapacitors, the life cycle of first energy storage device 106 may more closely match the life cycle of second energy storage device 108. However, in general, first energy storage device 106 is a larger and more costly device than second energy storage device 108 due to its increased power rating. According to embodiment of the invention, it remains an advantage to reduce the level of deep energy draws from first energy source device 106 both to increase its life as well as avoid operation at substantially low voltage levels that would reduce performance of drive system 118. Accordingly, system controller 104 operates as described herein during acceleration events to utilize stored energy in the entire usable energy storage range of second energy storage device 108 during known acceleration events. Further, during known deceleration events, system controller 104 is also programmed to capture regenerative braking energy in second energy storage device 108 to cause second energy storage device 108 to store a maximum amount of usable energy therein. Thus, the entire usable energy storage range is filled with energy during the deceleration.

Figure 4:
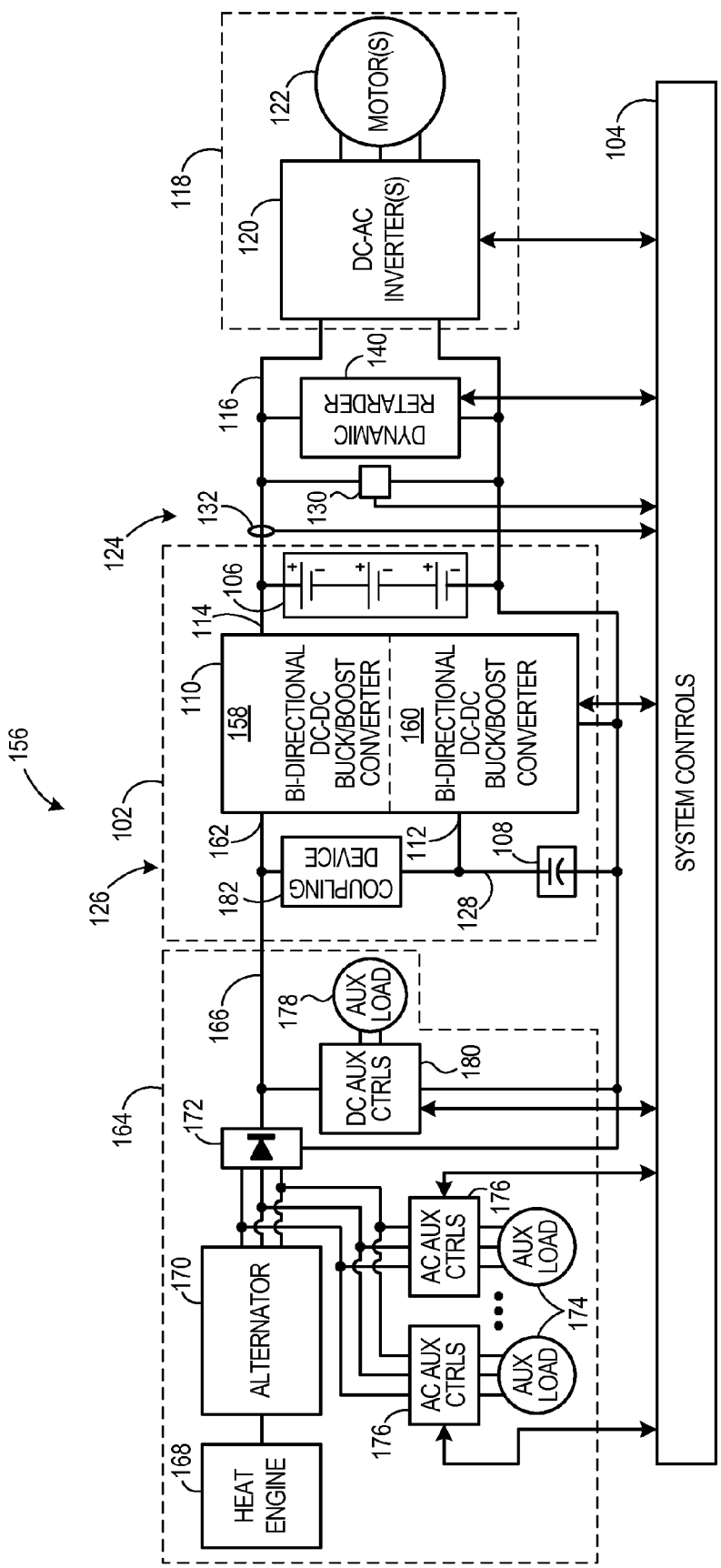
FIG. 4 schematically illustrates another embodiment of a propulsion system according to an embodiment of the invention.

FIG. 4 illustrates another embodiment of the invention. Propulsion system 156 shown in FIG. 4 includes components similar to components shown in system 100 of FIG. 1, and thus numbers used to indicate components in FIG. 1 will also be used to indicate similar components in FIG. 4.

As illustrated in FIG. 4, buck/boost converter assembly 110 is a multi-buck/boost converter assembly. That is, buck/boost converter assembly 110 includes first and second bi-directional DC-DC buck/boost converters 158, 160 having respective input channels 112 and 162. First and second bi-directional DC-DC buck/boost converters share the connection of output channel 114 to DC link 116.

In addition to components 102-140 common with propulsion system 100, energy system 102 of propulsion system 156 includes an auxiliary energy system 164 coupled to a second channel 162 of bi-directional buck/boost converter 110 via a bus 166. Auxiliary energy system 164 includes a heat engine (or internal combustion engine) 168 coupled to an engine-driven alternator 170. Alternatively the heat engine could be a gas turbine or any external combustion engine. Alternator 170 converts mechanical energy received from heat engine 168 into AC power or energy and supplies the AC power or energy to a rectifier assembly 172 configured to convert the AC power or energy into DC power or energy for supply to bus 166. Alternatively, although not shown, a fuel cell could replace the heat engine 168 and alternator 170.

Auxiliary energy system 164 includes one or more AC auxiliary loads 174 controlled by one or more AC auxiliary load controls 176 coupled to alternator 170. In addition, auxiliary energy system 164 may include one or more DC auxiliary loads 178 controlled by one or more DC auxiliary load controls 180, which may include DC-AC inverters coupled to AC auxiliary loads. The DC-AC inverter may also include passive filter components to improve electrical waveform quality. The auxiliary AC or DC loads may include, for example, an air conditioning unit, a pneumatic or other fluid compressor unit, a pump, a cooling fan, a heater, lights, and other electrical loads separate from the traction system. In one embodiment, heat engine 168 and alternator 170 may be sized to handle the maximum load required to operate all attached loads.

As described above, according to embodiments of the invention, system controller 104 causes stored energy in the entire usable energy storage range of second energy storage device 108 to be utilized during known acceleration events while utilizing energy stored in first energy storage device 106. Further, during known deceleration events, system controller 104 is also programmed to capture regenerative braking energy in second energy storage device 108 to cause second energy storage device 108 to store a maximum amount of usable energy therein.

According to another embodiment of the invention, system controller 104 is configured to cause channel 162 of bi-directional buck/boost converter 110 to convert voltage from auxiliary energy system 164 to provide extra acceleration power to assist second energy storage device 108 or to provide extra acceleration power after the usable stored energy of second energy source device 108 has been exhausted. In addition, based on a feedback from AC auxiliary load controls 176 and any DC auxiliary load controls 180, system controller 104 can determine which loads 174, 178 are receiving power from alternator 170 and whether excess power is available or whether additional power from heat engine 168 and alternator 170 is needed. If a sufficient amount of excess power is available without having to shut off one or more loads 174, 178, then system controller 104 may cause bi-directional buck/boost converter 110 to boost available voltage on bus 166 for the acceleration.

However, if system controller 104 determines that there is no excess power or that the excess power is not sufficiently high enough to provide the additional acceleration power needed, then system controller 104 is configured to turn off or reduce the power draw from one or more loads 174, 178 such that power from heat engine 168 and alternator 170 may be used to provide the power for acceleration. That is, system controller 104 may control AC or DC auxiliary load controls 176, 180 such that respectively coupled loads 174, 178 draw less power from alternator 170, thus freeing that power for use in conversion and acceleration.

In addition to providing additional acceleration power or energy as described above, auxiliary energy system 164 may also be used to provide charging power or energy to re-charge second energy storage device 108 or first energy storage device 106. That is, system controller 104 may be configured to use excess power or energy supplied by alternator 170 during low power operation, for example during constant speed or cruising mode of operation, or non-propulsion moments (such as when the vehicle is stopped) to boost the excess power or energy for re-charging first energy storage device 106 via boosting control of bi-directional buck/boost converter 158 or for re-charging second energy storage device 108 via bucking control of bi-directional buck/boost converter 160 to lower boosted auxiliary power.

Propulsion system 156 also includes a coupling device 182 configured to selectively couple channel 112 of buck/boost converter assembly 110 to channel 162 thereof. In event that the usable power or energy stored by second energy storage device 108 is exhausted (such as after an acceleration event), coupling device 182 conducts such that voltage from auxiliary energy system 164 may be boosted to DC link 116 voltage using two channels (112 and 162) of bi-directional buck/boost converter 110 thereby allowing approximately twice the rated power compared to a single channel of bi-directional buck/boost converter 110 to facilitate operation of the vehicle. In one embodiment, coupling device 182 is a diode configured to automatically couple channels 112 and 162 of bi-directional buck/boost converter 110 when the usable voltage of second energy storage device 108 drops below the lower voltage threshold. In another embodiment, coupling device 182 includes a voltage sensor (not shown) and a contactor (not shown). In this embodiment, when sensed voltage of second energy storage device 108 drops to or below the lower usable SOC threshold, system controller 104 can cause the contactor to close, thus coupling channel 112 to channel 162. Alternate implementations of the coupling device 152 could also be implemented with power semiconductor device(s), including Silicon Controller Rectifiers (SCR's) or a contactor.

Figure 5:
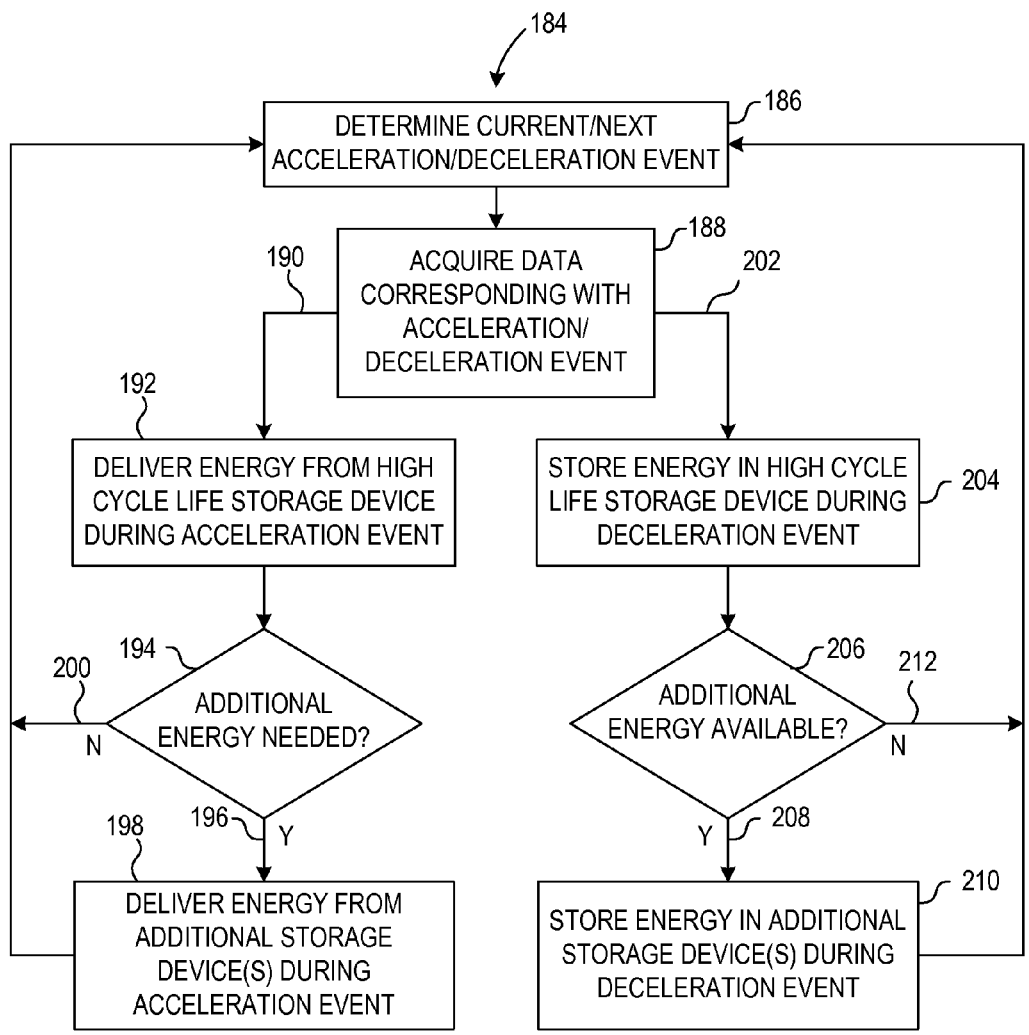
FIG. 5 is a flowchart illustrating procedure steps of the system controller according to an embodiment of an embodiment of the invention.

Referring now to FIG. 5, a flowchart 184 describing an operation algorithm of the system controller 104 according to an embodiment of the invention is shown. At step 186, the system controller determines the current or next acceleration or deceleration event. For example, based on a positional measurement of the vehicle received from a position measurement device, such as vehicle position sensor 138, or based on a time or distance measurement, the position or location of the vehicle along a known route can be determined. The vehicle's position or location may indicate an upcoming acceleration or deceleration event or may indicate that the vehicle should be in the acceleration or deceleration event. Data corresponding with the current or next acceleration/deceleration event is acquired from a database of such stored information in step 188. The event data may include, for example, a time duration of the event as well as power requirements expected to be used or generated by a load or generator during the event.

If the current or next event is an acceleration event 190, controller 104 is configured to cause energy from the usable energy storage range of the higher life cycle energy storage device, such as second energy storage device 108, to be completely delivered during the acceleration event at step 192. In this step, the energy from the usable energy storage range is used or exhausted during the acceleration event. That is, prior to the acceleration event, it is contemplated that second energy storage device 108 has a state of charge equal to or substantially equal to its upper usable SOC threshold. Accordingly, during the acceleration event, system controller 104 is programmed to cause second energy storage device 108 to deliver all of its usable stored energy such that, at the end of the acceleration event, the state of charge of second energy storage device 108 is equal to or substantially equal to its lower usable SOC threshold.

At step 194, controller 104 is configured to determine whether additional energy is needed from other energy storage devices or by control of aux loads (such as the embodiment shown in FIG. 4) during the acceleration event. This may be determined based on the acquired data corresponding with acceleration event together with the power ratings of the energy storage devices in the system, for example. If additional energy is needed 196, controller 104 causes energy from additional storage devices to be delivered during the acceleration event at step 198. This additional energy is thus after exhaustion of the usable storage energy of the high cycle life storage device.

After the acceleration event or if additional energy is not needed 200, process control returns to step 186, and the operation algorithm continues as described above while the vehicle continues travel along the known route.

If the current or next event is a deceleration event 202, controller 104 is configured to cause regenerative energy to be stored in the higher life cycle energy storage device, such as second energy storage device 108, during the deceleration event at step 204. Regenerative energy may be generated by operating electric drive 118 in a regenerative mode during the deceleration event, wherein electric power or energy is returned to DC link 116 through DC-AC inverter 120. In this step, the regenerative energy completely replenishes or fills the entire usable energy storage range of the storage device. That is, prior to the deceleration event, it is contemplated that second energy storage device 108 has a state of charge less than its lower usable SOC threshold. Accordingly, during the deceleration event, system controller 104 is programmed to cause second energy storage device 108 to completely replenish or fill of its usable stored energy such that, at the end of the deceleration event, the state of charge of second energy storage device 108 is equal to or substantially equal to its upper usable SOC threshold.

At step 206, controller 104 is configured to determine whether additional regenerative energy is available, and if so 208, controller 104 causes regenerative energy to be delivered to and stored in an additional energy storage devices of the system during the deceleration event at step 210. After the deceleration event or if additional regenerative energy is not available 212, process control returns to step 186, and the operation algorithm continues as described above while the vehicle continues travel along the known route.

Figure 6:
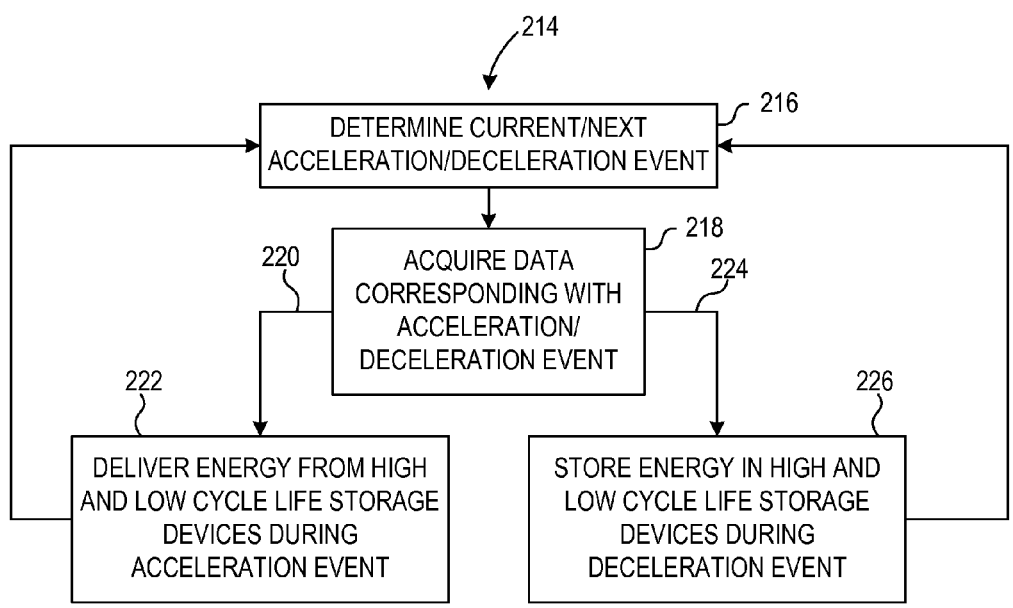
FIG. 6 is a flowchart illustrating procedure steps of the system controller according to another embodiment of an embodiment of the invention.

FIG. 6 illustrates a flowchart 214 describing an operation algorithm of the system controller 104 according to another embodiment of the invention. While flowchart 184 above describes an embodiment where the energy stored and delivered from the higher life cycle energy storage device is used prior to storing and using the energy from the lower life cycle energy storage device, flowchart 214 describes an embodiment where the higher and lower live cycle energy storage devices are used simultaneously. At step 216, the system controller determines the current or next acceleration or deceleration event. For example, based on a positional measurement of the vehicle received from a position measurement device, such as vehicle position sensor 138, or based on a time or distance measurement, the position or location of the vehicle along a known route can be determined. The vehicle's position or location may indicate an upcoming acceleration or deceleration event or may indicate that the vehicle should be in the acceleration or deceleration event. Data corresponding with the current or next acceleration/deceleration event is acquired from a database of such stored information in step 218. The event data may include, for example, a time duration of the event as well as power requirements expected to be used or generated by a load or generator during the event.

If the current or next event is an acceleration event 220, controller 104 is configured to cause energy from the usable energy storage range of the higher and lower life cycle energy storage devices, such as first and second energy storage devices 106 and 108, to be completely delivered during the acceleration event at step 222. In this step, the energy from the usable energy storage range in the higher life cycle energy storage device is used or exhausted during the acceleration event while energy from the lower life cycle energy storage device is supplied at a lower rate than if used alone. During the acceleration event, system controller 104 is programmed to cause first energy storage device 106 to deliver a portion of its usable stored energy simultaneously with a delivery of all of the usable stored energy in second energy storage device 108 such that, at the end of the acceleration event, the state of charge of second energy storage device 108 is equal to or substantially equal to its lower usable SOC threshold.

After the acceleration event, process control returns to step 216, and the operation algorithm continues as described above while the vehicle continues travel along the known route.

If the current or next event is an deceleration event 224, controller 104 is configured to cause regenerative energy to be stored simultaneously in the higher and lower life cycle energy storage devices, such as first and second energy storage devices 106 and 108, during the deceleration event at step 226. Regenerative energy may be generated by operating electric drive 118 in a regenerative mode during the deceleration event, wherein electric power or energy is returned to DC link 116 through DC-AC inverter 120. In this step, the regenerative energy completely replenishes or fills the entire usable energy storage range of the storage device. That is, prior to the deceleration event, it is contemplated that second energy storage device 108 has a state of charge less than its lower usable SOC threshold. Accordingly, during the deceleration event, system controller 104 is programmed to cause second energy storage device 108 to completely replenish or fill of its usable stored energy such that, at the end of the deceleration event, the state of charge of second energy storage device 108 is equal to or substantially equal to its upper usable SOC threshold. Controller 104 also causes regenerative energy to be delivered to and stored in an additional energy storage devices of the system during the deceleration event at step 226. After the deceleration event, process control returns to step 216, and the operation algorithm continues as described above while the vehicle continues travel along the known route.

One skilled in the art will appreciate system controller 106 may be implemented via a plurality of components such as one or more of electronic components, hardware components, and/or computer software components. These components may include one or more tangible computer readable storage media that generally stores instructions such as software, firmware and/or assembly language for performing one or more portions of one or more implementations or embodiments. Examples of a tangible computer readable storage medium include a recordable data storage medium and/or mass storage device. Such tangible computer readable storage medium may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of tangible computer readable storage media not listed may be employed with embodiments of the invention.

A number of such components can be combined or divided in an implementation of the systems described herein. Further, such components may include a set and/or series of computer instructions written in or implemented with any of a number of programming languages, as will be appreciated by those skilled in the art.

A technical contribution for the disclosed method and apparatus provides for a computer-implemented device capable of optimizing battery cycle life of a vehicle or non-vehicle system.

Therefore, according to an embodiment of the invention, a multi-energy storage device system includes a first energy storage device coupled to a direct current (DC) link and a load coupled to the DC link and configured to receive energy from the DC link. A bi-directional buck/boost converter assembly includes a first bi-directional buck/boost converter, the first bi-directional buck/boost converter comprising an output channel coupled to the DC link and comprising a first input channel. A second energy storage device coupled to the first input channel of the first bi-directional buck/boost converter via a first DC bus is included, the second energy storage device having a usable energy storage range defining an entire amount of usable energy storable in second energy storage device. The system also includes a system controller and a database comprising stored information related to a known acceleration event in which a supply of energy to the load is desired. The system controller is configured to acquire the stored information related to the known acceleration event and, during the known acceleration event, cause the first bi-directional buck/boost converter to boost the voltage of the second energy storage device and to supply the boosted voltage to the DC link to power the load such that after the known acceleration event, the state of charge of the second energy storage device is less than or substantially equal to a minimum usable energy storage state of charge.

According to another embodiment of the invention, a method of assembling a propulsion energy system includes coupling a first energy storage device to a direct current (DC) link and coupling an output channel of a bi-directional buck/boost converter assembly the DC link, the bi-directional buck/boost converter comprising a bi-directional buck/boost converter. The method also includes coupling a second energy storage device to a first input channel of the bi-directional buck/boost converter and coupling a load to the DC link. The second energy storage device has a usable energy storage range defining an entire amount of usable energy storable in second energy storage device, and the load is configured to receive energy from one of the first energy storage device and the second energy storage device via the DC link. The method further includes coupling a controller to the first and second energy storage devices, to the bi-directional buck/boost converter, and to the load and configuring the controller to acquire a first set of stored information from a storage database, the first set of stored information related to a known acceleration event in which energy is to be supplied to the load. The controller is also configured to cause the bi-directional buck/boost converter to boost an the stored voltage in the second energy storage device during the known acceleration event and to supply the boosted voltage to the DC link to power the load such that after the known acceleration event, the state of charge of the second energy storage device is less than or substantially equal to a minimum usable energy storage state of charge.

According to yet another embodiment of the invention, a non-transitory computer readable storage medium having a computer program stored thereon and representing a set of instructions that when executed by a computer causes the computer to access a database comprising stored information related to a known acceleration event in which a supply of energy to a load is recorded for increasing a speed of rotation associated with the load. The set of instructions also cause the computer to cause a bi-directional buck/boost converter to boost a first energy storage device and to supply the boosted voltage to a DC link to power the load during the known acceleration event to increase the speed of rotation associated with the load such that after the known acceleration event, the state of charge of the first energy storage device is less than or substantially equal to a minimum usable energy storage state of charge, wherein the first energy storage device has a usable energy storage range defining an entire amount of usable energy storable therein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A multi-energy storage device system comprising:
   a first energy storage device coupled to a direct current (DC) link;
   a load coupled to the DC link and configured to receive energy from the DC link;
   a bi-directional buck/boost converter assembly comprising a first bi-directional buck/boost converter, the first bi-directional buck/boost converter comprising an output channel coupled to the DC link and comprising a first input channel;
   a second energy storage device coupled to the first input channel of the first bi-directional buck/boost converter via a first DC bus, the second energy storage device having a usable energy storage range defining an entire amount of usable energy storable in second energy storage device;
   a database comprising stored information related to a known acceleration event in which a supply of energy to the load is desired; and
   a system controller configured to:
      acquire the stored information related to the known acceleration event; and
      during the known acceleration event, cause the first bi-directional buck/boost converter to boost the voltage of the second energy storage device and to supply the boosted voltage to the DC link to power the load such that after the known acceleration event, the state of charge of the second energy storage device is less than or substantially equal to a minimum usable energy storage state of charge;
   wherein the first bi-directional buck/boost converter bucks and boosts voltages received thereby so as to provide voltage to a high voltage side and a low voltage side of the multi-energy storage device system; and
   wherein the first energy storage device is coupled to the DC link on the high voltage side of the multi-energy storage device system and the second energy storage device is coupled to the first input channel of the first bi-directional buck/boost converter on the low voltage side of the multi-energy storage device system.

2. The system of claim 1 wherein the first energy storage device has a lower cycle life than that of the second energy storage device.

3. The system of claim 2 wherein the first energy storage device comprises a battery; and
   wherein the second energy storage device comprises an ultracapacitor.

4. The system of claim 2 wherein the first energy storage device comprises an ultracapacitor; and
   wherein the second energy storage device comprises an ultracapacitor.

5. The system of claim 1 wherein the usable energy storage range is bounded by an upper usable state of charge (SOC) threshold and a lower usable SOC threshold; and
   wherein the system controller, in being configured to cause the first bi-directional buck/boost converter to boost the voltage in the second energy storage device, is configured to cause the first bi-directional buck/boost converter to boost the voltage in the second energy storage device until the state of charge of the second energy storage device has substantially reached the lower usable SOC threshold.

6. The system of claim 1 wherein the system controller is further configured to cause the first energy storage device to deliver energy to the DC link to power the load during the known acceleration event.

7. The system of claim 6 wherein the system controller, in being configured to cause the first energy storage device to deliver energy to the DC link, is configured to cause the first energy storage device to deliver energy to the DC link simultaneously while energy is being delivered from second energy storage device during the known acceleration event.

8. The system of claim 1 wherein the database further comprises stored information related to a known deceleration event; and
   wherein the system controller is further configured to:
      acquire the stored information related to the known deceleration event; and
      during the known deceleration event:
         cause the first bi-directional buck/boost converter to deliver regenerative braking energy to the second energy storage device; and
         cause the second energy storage device to store regenerative braking energy to such that after the known deceleration event, the energy stored in the second energy storage device is substantially equal to the usable energy storage range.

9. The system of claim 8 wherein the usable energy storage range is bounded by an upper usable state of charge (SOC) threshold and a lower usable SOC threshold; and
   wherein the system controller, in being configured to cause the second energy storage device to store regenerative braking energy, is configured to cause the second energy storage to store regenerative braking energy until the state of charge of the second energy storage device has substantially reached the upper usable SOC threshold.

10. The system of claim 1 wherein the bi-directional buck/boost converter assembly further comprises a second bi-directional buck/boost converter comprising a second input channel and comprising an output channel coupled to the DC link;
   further comprising a third energy storage device coupled to the second bi-directional buck/boost converter, wherein the third energy storage device ; and
   wherein the system controller is further configured to cause the second bi-directional buck/boost converter to boost a voltage from the third energy storage device and to supply the boosted voltage to the DC link to power the load during a mode of operation outside the acceleration event.

11. The system of claim 1 wherein the bi-directional buck/boost converter assembly further comprises a second bi-directional buck/boost converter comprising a second input channel and comprising an output channel coupled to the DC link;

further comprising an auxiliary system coupled to the second input channel, the auxiliary system comprising:
an auxiliary energy source;
an auxiliary load; and
an auxiliary load controller coupled to the auxiliary energy source and to the auxiliary load; and
wherein the system controller is further configured to cause the second bi-directional buck/boost converter to boost a voltage from the auxiliary energy source during the known acceleration event.

12. The system of claim 11 wherein the system controller is further configured to cause the auxiliary load controller to reduce a power draw by the auxiliary load during the known acceleration event.

13. The system of claim 11 wherein the system controller is further configured to:
cause the second bi-directional buck/boost converter to boost a voltage from the auxiliary energy source;
cause the first bi-directional buck/boost converter to buck the boosted voltage; and
cause the second energy storage device to store the bucked voltage.

14. The system of claim 1 wherein the load comprises:
an DC-AC inverter coupled to the DC link; and
an electromechanical device coupled to the DC-AC converter.

15. A method of assembling a propulsion energy system, the method comprising:
coupling a first energy storage device to a direct current (DC) link;
coupling an output channel of a bi-directional buck/boost converter to the DC link, the bi-directional buck/boost converter configured to buck and boost voltages received thereby so as to provide voltage to a high voltage side and a low voltage side on the propulsion system;
coupling a second energy storage device to a first input channel of the bi-directional buck/boost converter, the second energy storage device having a usable energy storage range defining an entire amount of usable energy storable in second energy storage device;
coupling a load to the DC link, the load configured to receive energy from one of the first energy storage device and the second energy storage device via the DC link;
coupling a controller to the bi-directional buck/boost converter and to the load; and
configuring the controller to:
acquire a first set of stored information from a storage database, the first set of stored information related to a known acceleration event in which energy is to be supplied to the load; and
cause the bi-directional buck/boost converter to boost an the stored voltage in the second energy storage device during the known acceleration event and to supply the boosted voltage to the DC link to power the load such that after the known acceleration event, the state of charge of the second energy storage device is less than or substantially equal to a minimum usable energy storage state of charge;
wherein coupling the first energy storage device comprises coupling the first energy storage device to the DC link on the high voltage side of the propulsion system; and
wherein coupling the second energy storage device comprises coupling the second energy storage device to the first input channel of the bi-directional buck/boost converter on the low voltage side of the propulsion system.

16. The method of claim 15 further comprising configuring the controller to:
acquire a second set of stored information from the storage database, the second set of stored information related to a known deceleration event in which energy is to be supplied by the load; and
cause the second energy storage device to store at least a portion of the energy supplied by the load device during the known deceleration event such that after the known deceleration event, the energy stored in the second energy storage device is substantially equal to a maximum usable energy storage of the second energy storage device.

17. The method of claim 16 further comprising configuring the controller to cause the first energy storage device to store at least a portion of the energy supplied by the load device during the known deceleration event.

18. The method of claim 15 further comprising configuring the controller to cause the first energy storage device to deliver energy to the DC link to power the load during the known acceleration event.

19. The method of claim 15 wherein the first energy storage device comprises a battery having a first cycle life; and
wherein the second energy storage device comprises an ultracapacitor having a second cycle life greater than the battery.

20. A non-transitory computer readable storage medium having a computer program stored thereon and representing a set of instructions that when executed by a computer causes the computer to:
access a database comprising stored information related to a known acceleration event in which a supply of energy to a load is recorded for increasing a speed of rotation associated with the load;
cause a bi-directional buck/boost converter to boost voltage from a first energy storage device and to supply the boosted voltage to a DC link to power the load during the known acceleration event to increase the speed of rotation associated with the load such that after the known acceleration event, the state of charge of the first energy storage device is less than or substantially equal to a minimum usable energy storage state of charge, wherein the first energy storage device has a usable energy storage range defining an entire amount of usable energy storable therein.

21. The computer readable storage medium of claim 20 wherein the set of instructions further causes the computer to:
access the database comprising stored information related to a known deceleration event in which a supply of energy from a load to the DC link is recorded for decreasing the speed of rotation associated with the load;
cause the bi-directional buck/boost converter to buck the supply of energy from the load and to supply bucked energy to the first energy storage device for storage therein such that after the known deceleration event, the energy stored in the first energy storage device causes a state of charge of the first energy storage device to be substantially equal to a maximum usable energy state of charge.

22. The computer readable storage medium of claim 21 wherein the set of instructions further causes the computer to:
cause a second energy storage device to supply voltage to the DC link to power the load during the known acceleration event after the state of charge of the first energy storage device has substantially reached the minimum usable energy state of charge, wherein the second energy storage device has a lower life cycle than a life cycle of the first energy storage device; and cause the second energy storage device to store energy from the load during the known deceleration event after the state of charge of the first energy storage device has substantially reached the maximum usable energy state of charge.

\* \* \* \* \*